UNITED STATES PATENT OFFICE.

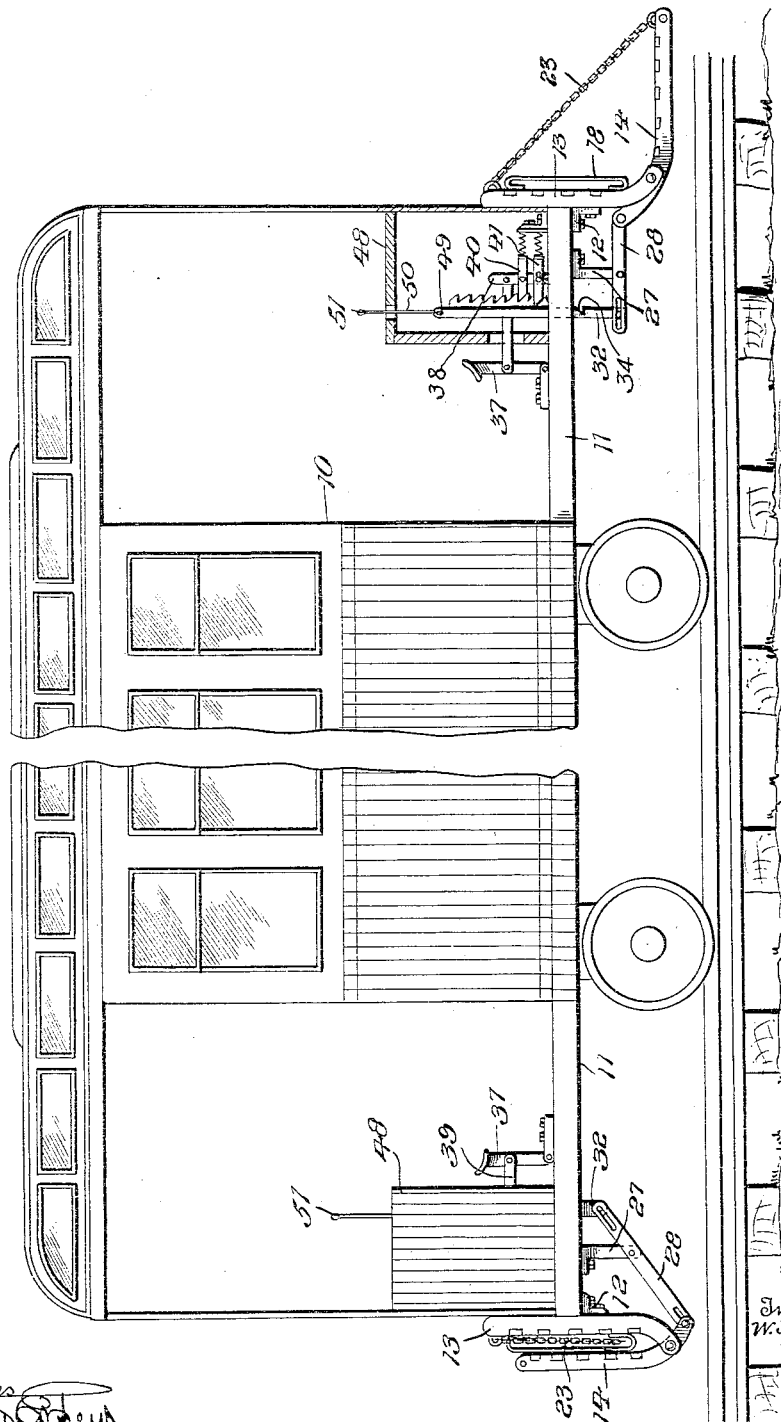

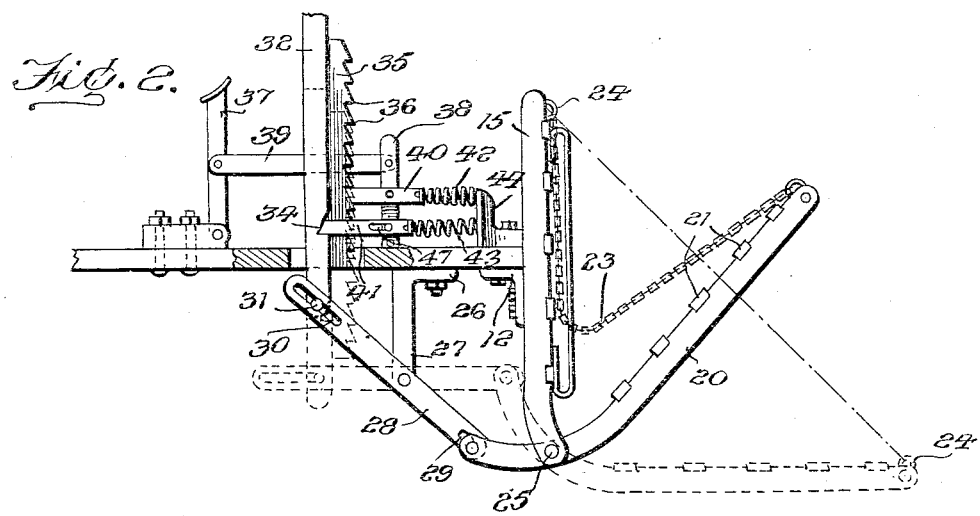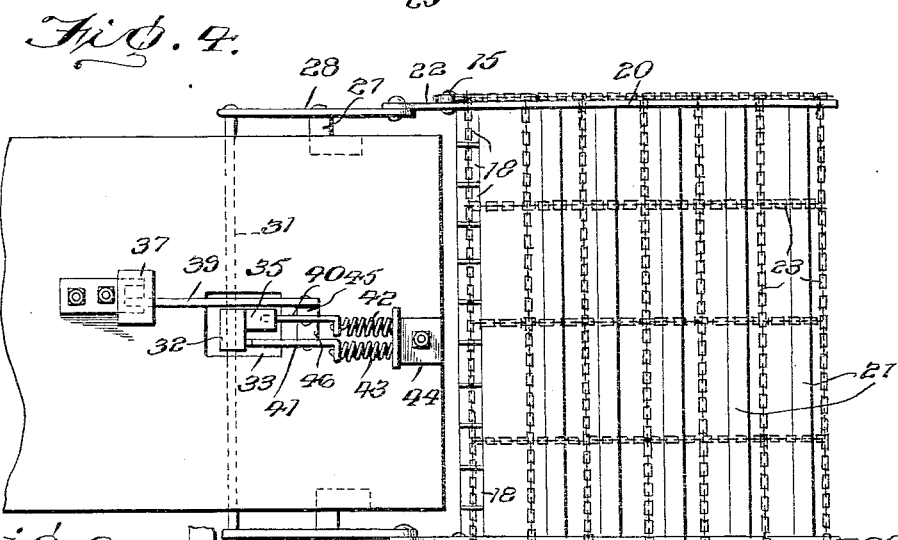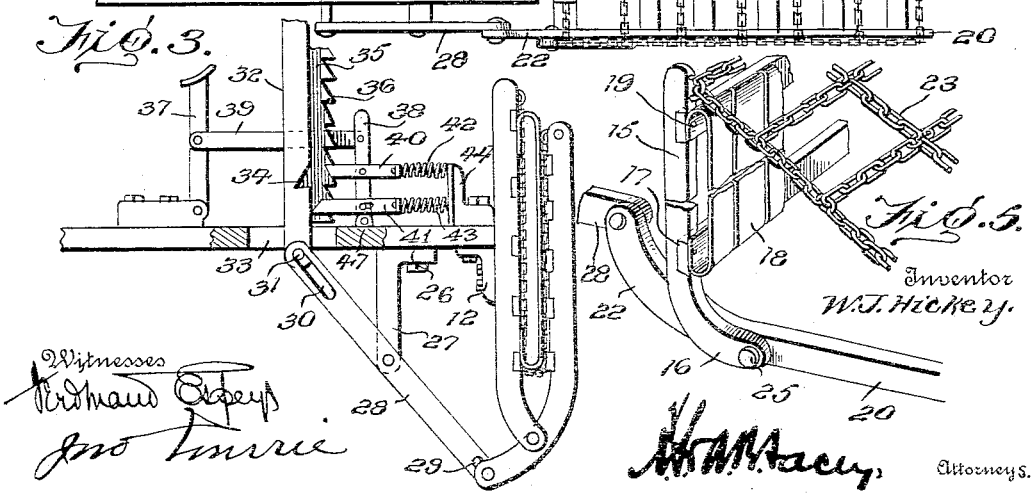

WILLIAM J. HICKEY, OF RENO, NEVADA.

AUTOMATIC FOLDING FENDER.

1,168,209.  Specification of Letters Patent.  Patented Jan. 11, 1916.

Application filed April 8, 1913, Serial No. 759,769. Renewed June 14, 1915. Serial No. 34,068.

*To all whom it may concern:*

Be it known that I, WILLIAM J. HICKEY, citizen of the United States, residing at Reno, in the county of Washoe and State of Nevada, have invented certain new and useful Improvements in Automatic Folding Fenders, of which the following is a specification.

My invention relates to new and useful improvements in fenders for street cars and the object of my invention is to provide a fender having a fixed section secured to the end of the car and extending vertically in advance of the same and a swinging section hingedly connected by its rear edge to the lower edge of the fixed section and normally extending in horizontal spaced relation above the ground, the forward end of said latter member or section being supported from the upper end of the first member by a flexible netting in such a manner that the impact of any body caught by the fender against the netting will cause the upward swinging of the forward end of the horizontal body member to prevent the body picked up by the fender from falling from the same.

A further object is to provide means for limiting the upward swinging of the horizontal fender member under impact of a body picked up by the fender to prevent any possibility of crushing the body so picked up between the vertical and horizontal fender members.

A further object of my invention is to provide means for automatically holding the horizontal fender member in its upswung position, said means being so arranged that the horizontal fender member may at any time be released by the motorman from the car. And a still further object of my invention is to provide means whereby the motorman, without descending from the car, may swing the horizontal fender member upwardly to bear against the vertical fender member when the fender is not in use.

With these and other objects in view, my invention will be more fully described, illustrated in the accompanying drawings, and then specifically pointed out in the claims which are attached to and form a part of this application.

In the drawings: Figure 1 is a fragmentary side elevation of a conventional form of street car showing one of my improved fenders applied to each end of the car, the fender at one end of the car being shown in operative position while that at the other end is shown with the horizontal member folded against the vertical member; Fig. 2 is a side elevation, in detail, of my improved fender and the operating mechanism therefor, a portion of the car platform being shown in section. This view shows the horizontal member of the fender in the position to which it would be swung by impact of a body against the netting, its normal position being shown in dotted lines. Fig. 3 is a view similar to that shown in Fig. 2, but illustrating the position of the parts when the horizontal member of the fender is folded against the vertical member; Fig. 4 is a top plan view of the fender and its operating mechanism, the horizontal section being shown in operative position, and Fig. 5 is a fragmentary detail perspective, showing the manner of connecting the fender members together and also showing certain details in construction of the vertical fender member, parts being broken away to permit the showing of the device upon a somewhat enlarged scale.

Corresponding and like parts are referred to in the following description and indicated in all the views of the drawings by the same reference characters.

In conformance with the usual custom, one of my improved fenders will be mounted upon each end of the car as shown in Fig. 1 in which a conventional form of car is indicated by the numeral 10, this car having at either end platforms 11. A pair of spaced apart L-shaped brackets 12 are secured to the lower face of each of the platforms and carry the vertical fender member indicated as a whole by the numeral 13, this vertical fender member in turn carrying the horizontal fender member 14.

As best shown in Fig. 5 of the drawings, the vertical fender member includes a pair of spaced apart side frames 15, the lower ends of which are curved forwardly as at 16, these frames being connected at spaced intervals by transversely extending parallel slats or bars 17. A plurality of plates or bars 18 of resilient metal have their end portions rebent to extend in parallel spaced relation to the body portion and in alinement with each other and these end portions are secured to the upper and lower slats 17 by bolts or other suitable fastening devices 19 in such a manner that the body portions of these strips extend vertically and in spaced relation to each other and to the body portion 13 of the fender to act as a resilient buffer for any object or person striking against the fender.

The horizontal fender member is somewhat similar in construction to the vertical fender member and includes spaced side frames 20 connected by a plurality of transversely extending spaced slats 21, the rear ends of the side members curving upwardly as shown at 22. A netting 23, formed of chains, rope or other flexible material, is secured along one edge to the upper edge portion of the fender member 13 by eye bolts or other suitable fastening devices 24 and secured by its opposite edge in like manner to the forward edge portion of the fender member 14, this netting being equal in width to the width of the fenders and of such length that when in extended position, as shown at the right of Fig. 1, it supports the horizontal fender member in active position, the fender members being hingedly connected to each other by bolts or pivot pins 25 passed through the lower ends of the sides 15 of the vertical fender member and through the sides 20 of the horizontal fender member immediately in advance of the upcurved end portion thereof.

Brackets 26 are secured to the car platform, one upon either side, and each of these brackets has a downwardly depending arm 27 upon the free end of which is pivotally mounted a lever 28. One end of each of these levers is slotted, as at 29, for pivotal connection with the rear end of the adjacent side frame 20 of the horizontal fender member, while the opposite ends of the levers are slotted as at 30 to receive a shaft 31. A rack member 32 extends through a slot 33 preferably formed centrally of the car platform and is mounted at its lower end upon the shaft 31. This rack member includes a vertically extending body portion provided intermediate its length with a pawl seat 34, the lower face of which extends horizontally and further provided throughout its height and at one side with a forwardly directed flange 35, the advance edge of which is notched to provide a plurality of rack teeth 36.

Swingingly mounted by their lower ends, one at the rear and one in advance of the rack member, is a foot pedal 37 and a lever 38, a link 39 pivotally connecting the intermediate portion of the foot pedal with the upper portion of the lever. Upper and lower pawls 40 and 41 are pivotally supported in parallel spaced relation to each other upon the intermediate portion of the lever 38 and are normally held in engagement with the rack member by helical springs 42 and 43, which are secured by one end to the forward ends of the pawls and by their other end to a supporting bracket 44. As best shown in Fig. 4 of the drawings, the pawl 40 is positioned in alinement with the rack teeth 36 by means of a sleeve 45 about the pawl pivot pin and bearing between the pawl and lever while the pawl 41 is similarly supported in alinement with the body portion of the rack member by a sleeve 46.

By reference to Figs. 2 and 3 of the drawings, it will be apparent that any engagement of the pawl 41 in the notch or pawl seat of the body portion of the rack member will lock the rack member against further upward movement, while any engagement of the pawl 40 with the teeth 36 of the rack member will lock the rack member against downward movement.

In order to permit the manual release of both pawls through a single foot pedal, the pawl 41 is provided with a slot 47 through which its pivot pin passes, this slot being of such length as to permit the spring to move the pawl forward independently of the lever to seat the same in the notch or pawl seat 34 when the latter is brought into alinement with the pawl, as shown in Fig. 2. It will also be clear from an inspection of Fig. 2 of the drawings that a forward swinging of the foot pedal will swing both pawls out of engagement with the rack member to permit the raising or lowering of the latter.

The fender actuating mechanism is preferably inclosed in a casing or housing 48, the foot pedal alone being exposed. In order to permit the manual raising of the rack member to swing the horizontal fender member into inoperative position I have provided the upper end of the rack member with an eye 49 to which is secured one end of a cord 50, the opposite end of which extends through the top of the housing and terminates in a ring 51.

From the foregoing description, the operation of my improved fender will be readily understood, and but a brief description of the same is therefore necessary. In use, the horizontal member of that fender upon the front of the car is lowered, as shown at the right of Fig. 1, while the horizontal member of the fender at the rear of the car is raised, as shown at the left of Fig. 1. In this position of the forward fender, the pawl 40 is in engagement with the rack teeth of the rack member, but this pawl and the rack teeth are so arranged as to in no way interfere with the upward movement of the rack member.

Any person struck by the car will, because of his impact against the netting 23, cause the horizontal fender member 14 to swing upwardly to some such position as that shown in full lines in Fig. 2 of the drawings, the exact amount of the upward swinging movement of course being dependent upon the force of impact. It will be clear that the pawl 40, being in constant engagement with the teeth of the rack member, will absolutely prevent any return movement of the horizontal fender member until manually released, and that the two fender members, together with the netting, thus form in effect a cradle for the support of the person struck. At the same time, the horizontal fender member cannot possibly swing, because of the impact, to a higher point than that shown in Fig. 2, because of the pawl 41, which automatically engages the pawl seat 34 of the rack member at this point to limit further upward movement of the rack member and consequently of the horizontal fender member. The motorman or other person on the car may, however, lower the horizontal fender member by merely pressing forward on the foot pedal 37 to simultaneously release both the pawls 40 and 41, whereupon the fender member will fall by gravity. In like manner, the horizontal fender member may be manually raised by the motorman from the car at any time by pulling upward on the cord 50 to raise the rack member, this upward movement of the rack member acting through the lever 28 to depress the rear end of the horizontal fender member and swing its forward end upwardly. By this manner the horizontal fender member may be raised to the position shown in Fig. 2 and then, if desired, to the position shown in Fig. 3 by pressing forward on the foot pedal to disengage the pawl 41 from its seat 34. As soon as the horizontal fender member has been raised to the desired position, the foot pedal is released to permit the pawl 40 to engage the teeth of the rack member and lock the fender in adjusted position.

From the foregoing description it will be apparent that I have provided an extremely simple and effective form of scoop fender, and one which, while automatic in its action, may be at any time manually operated by the motorman without the latter leaving the car.

It will of course be understood that I do not wish to limit myself to the specific details of construction illustrated in the drawings and described in the above specification as various minor changes, within the scope of the appended claims, may at any time be made, without in the slightest degree departing from the spirit of my invention.

Having thus described the invention, what is claimed as new is:

1. A fender including hingedly connected vertical and horizontal members, a diagonally extending flexible netting connecting the free edges of said members and movable rearwardly under impact to swing the free edge portion of the normally horizontal member upwardly, and means for automatically holding said member in upswung position, said means including a vertically reciprocable rack bar, a spring pressed pawl adapted to co-act with the teeth of said bar, and an operative connection between said bar and the normally horizontal fender member.

2. A fender including vertical and normally horizontal members hingedly connected, a flexible member connecting the free edges of said first members and movable rearwardly under impact to swing the free end of the normally horizontal member upwardly, and means for normally limiting the upward swinging of said member, said means being releasable to permit further upward swinging.

3. A fender including vertical and normally horizontal members hingedly connected, a flexible member connecting the free edges of said first members and movable rearwardly under impact to swing the free end of the normally horizontal member upwardly, and means for limiting the upward swinging of said member, said means including a vertically reciprocable rack member provided with a pawl seat, a spring pressed pawl adapted for engagement in said seat to limit the upward movement of the rack member, and operative connection between the rack member and the normally horizontal fender member.

4. In a fender construction, a vertical fender member, a normally horizontal fender member hingedly connected by its rear end to the lower end of the vertical fender member and supported at its forward end by a flexible netting connecting said forward end with the upper end of the vertical fender member, the normally horizontal fender member having rearwardly and upwardly directed arms, a vertically movable rack member provided with a plurality of rack teeth and with a pawl seat, a lever pivoted intermediate its length and operatively connected to the extended arms of the normally horizontal member and to the lower end of the rack member, spring pressed pawls mounted for automatic engagement one with the teeth of the rack member and one with the pawl seat thereof, and a lever operatively connected with said pawls for simultaneously disengaging the same from the rack member.

In testimony whereof I affix my signature in presence of two witnesses.

WILLIAM J. HICKEY. [L. S.]

Witnesses:
 OSCAR J. SMITH,
 JAMES GLYNN.

Copies of this patent may be obtained for five cents each, by addressing the "Commissioner of Patents, Washington, D. C."